Nov. 28, 1967
H. A. WILCOX ET AL
3,354,861
SCREW DRIVEN AMPHIBIOUS VEHICLE
Filed Nov. 17, 1965
3 Sheets-Sheet 1
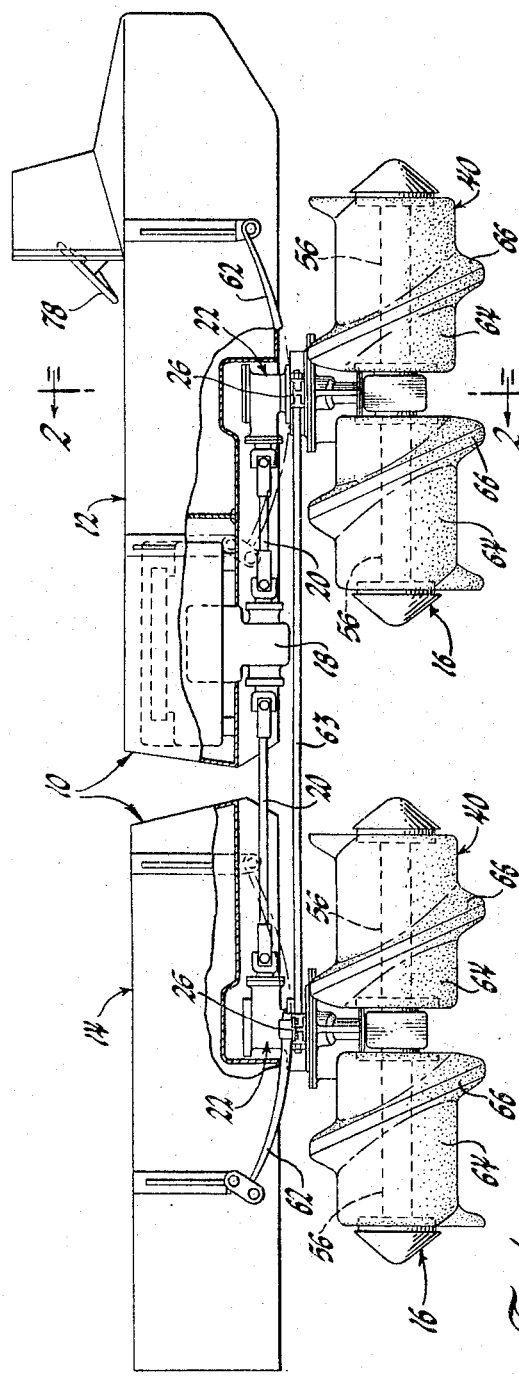
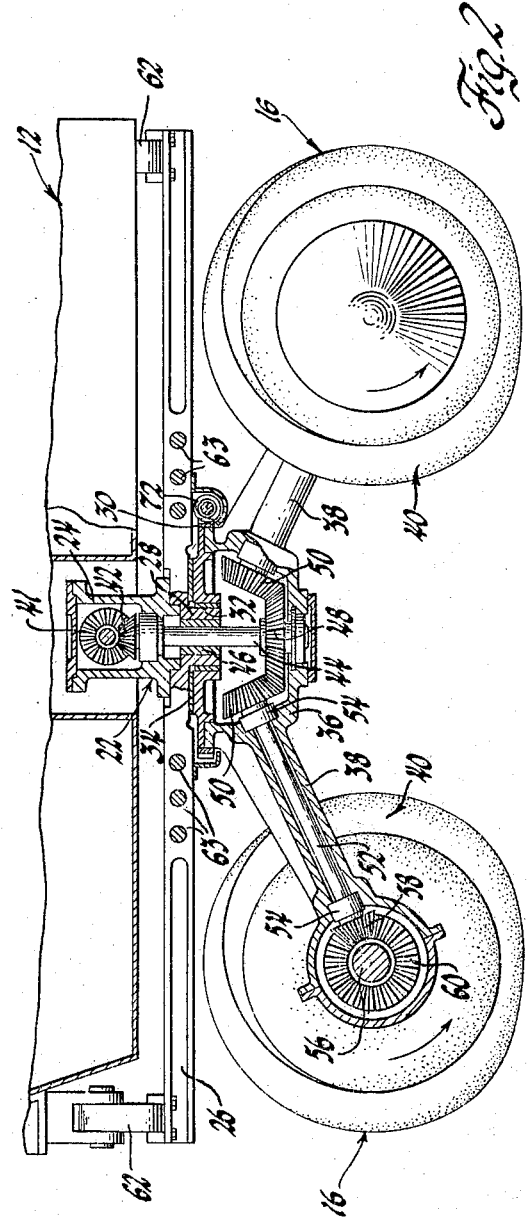
INVENTORS
Howard A. Wilcox &
Mieczyslaw G. Bekker
Herbert Furman
ATTORNEY Nov. 28, 1967  H. A. WILCOX ET AL  3,354,861
SCREW DRIVEN AMPHIBIOUS VEHICLE
Filed Nov. 17, 1965  3 Sheets-Sheet 2
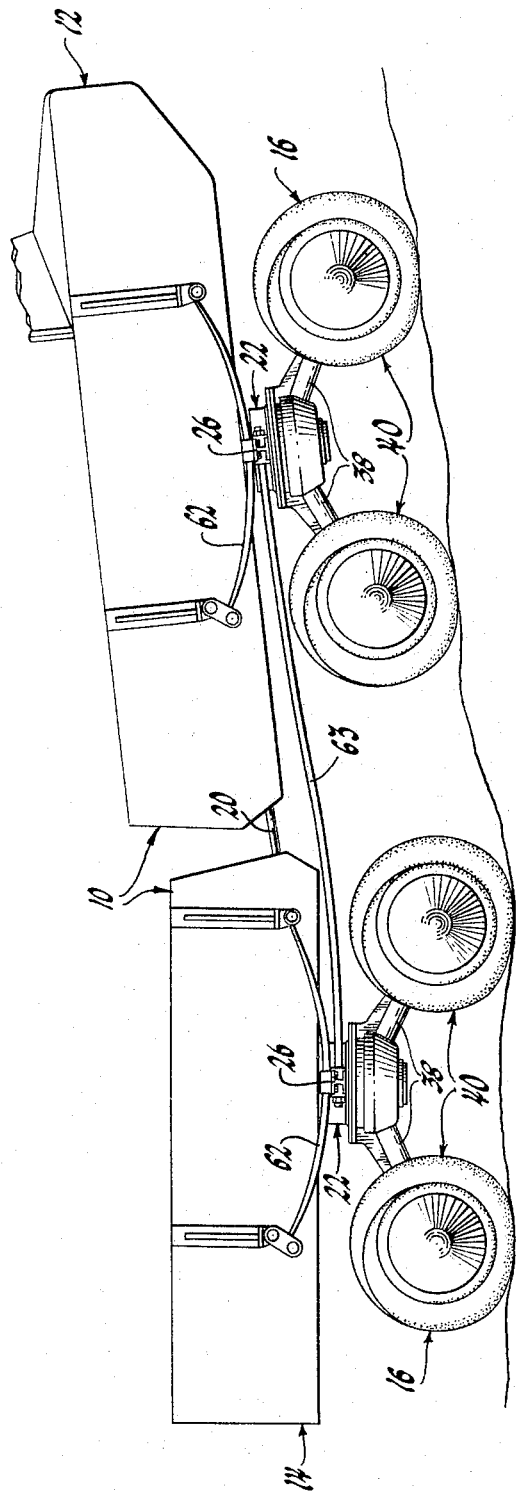
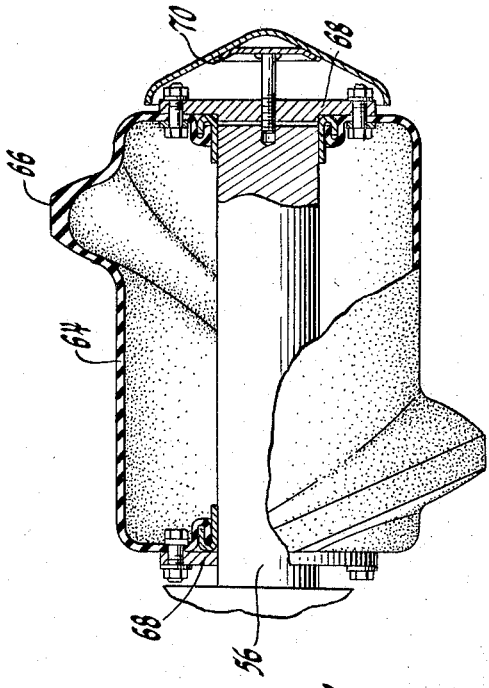
INVENTORS
Howard A. Wilcox &
Mieczyslaw G. Bekker
Herbert Furman
ATTORNEY Nov. 28, 1967  H. A. WILCOX ET AL  3,354,861
SCREW DRIVEN AMPHIBIOUS VEHICLE
Filed Nov. 17, 1965  3 Sheets-Sheet 3
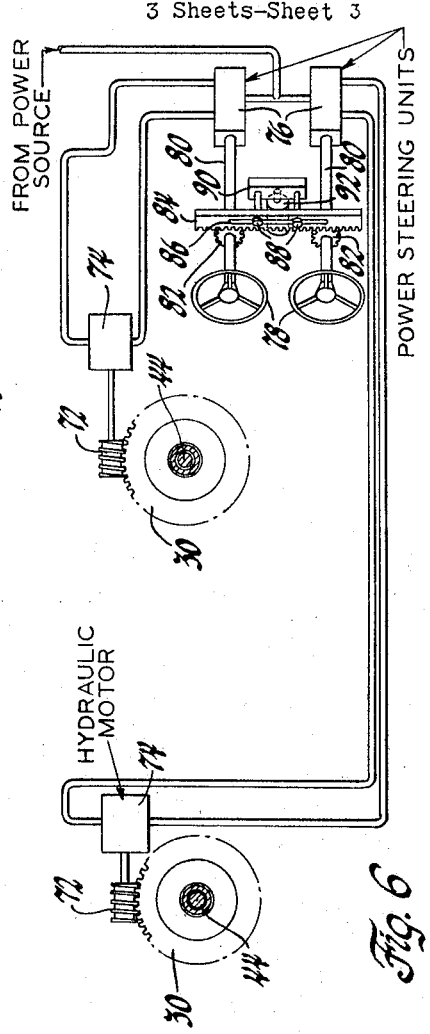
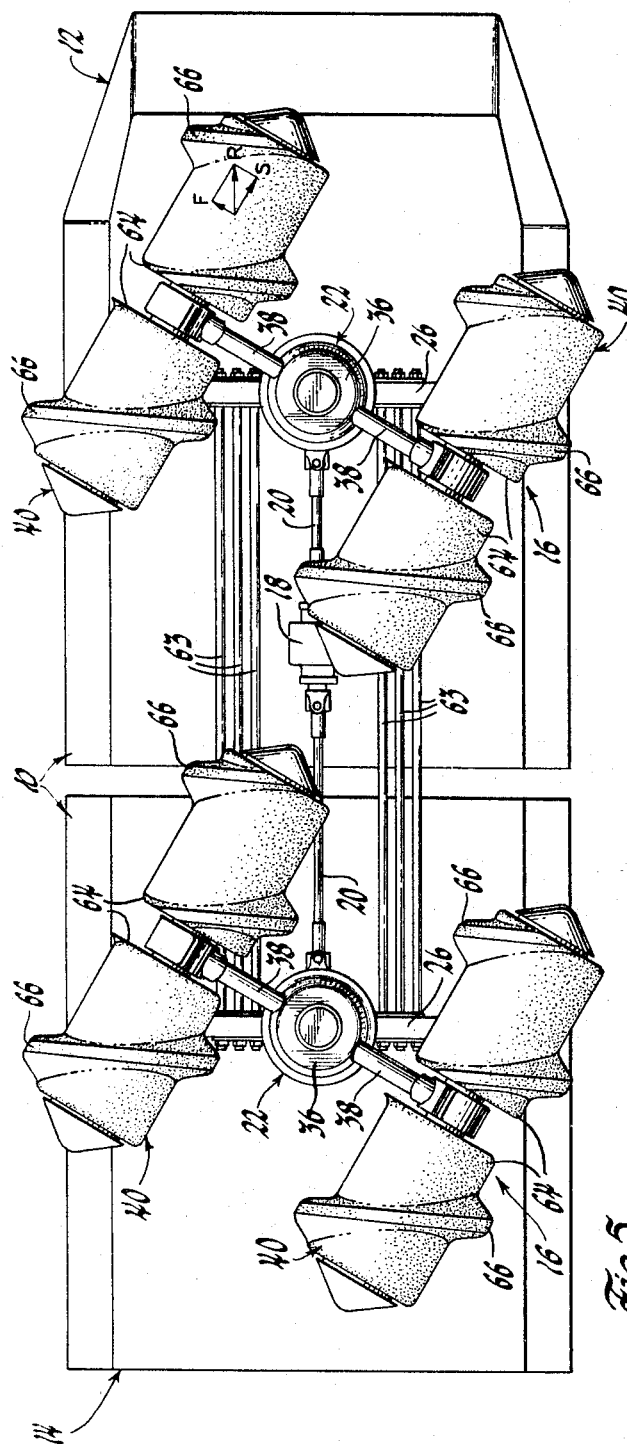
INVENTORS
Howard A. Wilcox &
Mieczyslaw G. Bekker
Herbert Furman
ATTORNEY

United States Patent Office 3,354,861
Patented Nov. 28, 1967

3,354,861
SCREW DRIVEN AMPHIBIOUS VEHICLE
Howard A. Wilcox and Mieczyslaw G. Bekker, Santa Barbara, Calif., assignors to General Motors Corporation, Detroit, Mich., a corporation of Delaware
Filed Nov. 17, 1965, Ser. No. 508,235
6 Claims. (Cl. 115—1)

ABSTRACT OF THE DISCLOSURE

A semi-articulated amphibious vehicle comprises a front and a rear section interconnected by a plurality of longitudinally extending flexible bars. Each section is provided with a propulsion unit including a pair of spaced propulsive screw rollers which are interconnected for pivotal movement about a normal steering axis by a power steering unit. Each roller includes a pair of axially aligned tires having a peripheral screw thread wound therearound in a common direction. The front and rear propulsion units are driven by a common power source such that the rollers rotate in a common direction. The power steering units may be conjointly or separately actuated to pivot the propulsion units for steering purposes and for orientation of the screw rollers relative to the vehicle in different attitudes so as to combine the effects of frictional and screw propulsion over varying terrain.

---

This invention relates generally to amphibious vehicles and more specifically to vehicles which are capable of continuously traversing all kinds of terrain, such as water, swamp, silt, mud, sand, clay, pavement and jagged rock.

Heretofore, many types of vehicles have been devised to traverse unimproved land surfaces, the most notable being track-laying vehicles and low-pressure roller-propelled vehicles. Also amphibious vehicles have been developed which utilize a pair of longitudinally disposed screw rollers that counter-rotate to provide propulsion through a fluid medium. However, when such a screw roller vehicle encounters a more substantial land surface, it must be stopped to reverse rotation of one of the rollers before the vehicle may then proceed only in a sidewards direction by the rolling propulsion of the co-rotating rollers. Also, such vehicle does not incorporate an effective land steering system.

The vehicle of the present invention embodies the advantages of the aforementioned vehicles, but has the additional advantages of being continuously steerable regardless of the terrain being traversed and of being capable of continuous propulsion in any desired direction over changing terrain.

These advantages are obtained by using co-rotating resilient screw rollers which are pivotable in pairs about steering axes normal to the rotational axes of the rollers. For propulsion through a fluid medium these screw rollers are oriented longitudinally of the vehicle and screw propulsion is provided. On a hard surface the rollers are pivoted to a position laterally of the vehicle to provide a rolling or frictional type of drive. Intermediate surfaces such as mud, sand or silt are traversed by orienting the rollers in a position intermediate longitudinal and lateral positions. Pivoting the rollers about the steering axes permits simple effective steering, while further enabling the vehicle to continue locomotion in any direction regardless of the variation in terrain encountered.

In the drawings:

FIGURE 1 is a partially broken away side view of an amphibious vehicle according to this invention, with the propulsive screw rollers thereof oriented longitudinally of the vehicle;

FIGURE 2 is a sectional view taken generally along the plane indicated by line 2—2 of FIGURE 1;

FIGURE 3 is a view similar to FIGURE 1 with the rollers oriented laterally of the vehicle;

FIGURE 4 is a cut-away view of one of the screw rollers;

FIGURE 5 is a bottom view showing the screw rollers angularly oriented; and

FIGURE 6 is a schematic diagram of the steering system.

Referring now to FIGURES 1 through 3, a preferred embodiment is depicted as a semi-articulated amphibious vehicle 10 composed of front and rear body sections 12 and 14 each having a propulsion unit 16. A motive power unit 18 is mounted at the rear of the front body section 12 and is connected by conventional shafting 20 to angle drive units 22 at each propulsion unit 16.

Each unit 22 includes a housing 24 rigidly seated on a central portion of a cross support 26 that includes a depending hub 28. A worm wheel 30 is rotatably journaled to hub 28 through a cylindrical bearing 32. An annular disc bearing 34 is interposed between the top surface of gear 30 and the support 26. These bearings 32 and 34 permit worm wheel 30 to rotate relative to support 26. A gear housing 36 is secured to worm wheel 30 and includes a pair of projecting arms 38 which each support a propulsive roller 40.

Shafting 20 has a terminal bevel gear 41 within housing 24 that drivingly engages a bevel gear 42 of a vertical shaft 44 rotatably journaled in bearings 46. Shaft 44 includes a bevel gear 48 that meshes with bevel gears 50 in housing 36. Each gear 50 is attached to a drive shaft 52 journaled in arms 38 by bearings 54. Each shaft 52 drives a roller axle 56 through bevel gears 58 and 60.

Each propulsion unit 16 is suspended from the vehicle body sections 12 and 14 by leaf springs 62 attached to supports 26. The supports 26 of the body sections 12 and 14 may be interconnected by means of a plurality of flexible bars 63, the functions of which are more fully described in the copending application of Bekker, Ser. No. 224,754, filed Sept. 19, 1962, and assigned to the assignee hereof.

As best shown in FIGURE 5, each of the forward and rearward propulsion units 16 comprise a pair of low pressure pneumatic screw rollers 40. Each roller 40 includes two cylindrical tires 64 having a screw thread 66. The threads of all rollers 40 spiral in a common direction. Each pair of tires 64 is mounted on a common axle 56 and could be combined into a single tire with power supplied at the ends rather than at the midpoint as shown.

Referring now to FIGURE 4, a pair of end hubs 68 are rigidly attached to the end of each screw roller axle 56 and the tire 64 is bolted to each end hub 68. The tires may be either pneumatic, foam-filled or a combination thereof. A substantially conical hub cap 70 is bolted to the end hub to provide a streamlined shape for propulsion through water.

Steering is provided by pivoting units 16 with respect to each body section 12 and 14 and supports 26 on bearings 32 and 34 about an axis normal to the roller axes. A worm 72 drivingly engages worm wheel 30 to provide this pivoting. In FIGURE 6 a schematic diagram of one possible power steering system is shown. Each worm 72 is driven by a hydraulic motor 74 that is provided with fluid from one of a pair of power steering units 76 mounted on the vehicle body. Each power steering unit 76 is connected to a separate steering wheel 78 through a steering shaft 80 that includes a spur gear 82 which is selectively engageable with a common rack 84. When rack 84 is engaged, rotation of either steering wheel 78 will accomplish simultaneous pivoting of each of the forward and rearward screw roller propulsion units 16. Rack 84 further includes an elongated slot 86 which receives a pair of control rods 88 that are further attached to a block 90 which is engaged by a control motor 92. When it is desired to steer the forward and rearward units separately, motor 92 is actuated to lift rack 84 from engagement with spur gears 82, thereby permitting individual rotation of steering wheels 78 and independent steering of the forward and rearward units 16.

Operation

The principle of operation of the invention is the combined use of both frictional or rolling propulsion and screw propulsion. Unlike previous screw roller vehicles wherein the rolling propulsive forces are cancelled out during screw propulsion and screw propulsive forces are cancelled during rolling propulsion, this invention concurrently utilizes both such forces by providing for the co-rotation of all rollers. As diagrammatically shown in FIGURE 5, rolling motion of the screw rollers will produce a propulsive component F whereas screw motion will produce a propulsive component S. By constructing a force vector parallelogram, it is seen that a propulsive resultant R is produced which determines the true forward progression of the screw roller units. Depending upon the type of terrain that is encountered the rolling and screw propulsive forces will vary in relation to each other. Thus, for different types of surfaces a directionally different resultant R will be produced. By merely pivoting each of the screw roller units about a vertical axis, either conjointly or independently, successively different terrain surfaces can be traversed successfully while keeping the vehicle body properly oriented.

For propulsion through a substantially liquid environment the screw roller units are oriented along the vehicle's longitudinal axis as shown in FIGURES 1 and 2. In this position the predominantly screw propulsion will be fully utilized to propel the vehicle forward. To traverse a more substantial surface such as rock, dirt or pavement, the screw roller units are positioned as shown in FIGURE 3, i.e., transversely of the vehicle. Upon such terrain, locomotion will be predominantly by rolling propulsion. When an intermediate type of terrain such as sand, silt, mud or swamp is encountered, the screw roller units may be oriented as shown in FIGURE 5 in order to combine the effects of both rolling and screw propulsion.

When both propulsion units are steered conjointly, the vehicle will "crab" off at an angle to the longitudinal axis of the vehicle body. In order to operate the vehicle in a more conventional manner, each of the screw roller units may be independently steered, thus permitting sharp turns while retaining proper vehicle body orientation. The capability of steering and locomotion in any direction provides excellent mobility.

As shown in FIGURE 3, the flexible bars 63 permit vertical articulation of the vehicle to permit the ascension of slopes. Roll is likewise possible, although horizontal articulation is prevented and would be here undesirable. The individual spring suspension of the forward and rearward screw roller units in combination with the flexible bar attachment arrangement is beneficial in traversing uneven terrain, effecting better traction and "ride."

It is understood that only one possible embodiment of the invention disclosed herein is shown by the accompanying drawings. Other variations contemplated would be to mount both screw roller units on a single rigid frame. In another variation the rearward pair of screw rollers could be replaced by a single screw roller. Any number of screw roller units could also be used on any one vehicle unit. The operation of these devices would be substantially the same as described above.

Moreover, the rollers could utilize a single or multiple thread and could be formed of spongy rubber, hard rubber or any other resilient construction or of rigid construction. Resilient roller construction is preferred because of a reduction in the possibility of injury to the rollers on sharp solid surfaces. Of course, any of a multitude of power steering units or manual steering units could be used. Any type of articulation as well as any number of articulated units could likewise be used. Each unit could contain its own power source or a single power source may serve a plurality of vehicle units. Also, any effective power transmission system may be substituted. Yet further modifications are possible without departing from the spirit or scope of this invention.

We claim:
1. An amphibious vehicle comprising a support structure, propulsive means including a plurality of axially rotatable screw rollers, all having similar screw threads spiraling therearound in the same direction, means pivotally mounting the screw rollers to the structure on steering axes normal to the roller axes, means for axially rotating the rollers in the same direction, and steering means connected to the rollers to pivot the rollers about the steering axis.

2. The vehicle of claim 1 wherein at least two spaced pairs of screw rollers are provided, the rollers of each pair being interconnected for simultaneous pivoting about the steering axis by the steering means.

3. The vehicle of claim 2 wherein the roller pairs are alternately separately and conjointly steerable by the steering means.

4. A method of propelling a vehicle comprising providing the vehicle with a plurality of axially rotatable screw rollers arranged in spaced units each comprising a pair of parallel rollers, rotating all rollers in the same direction, and steering the vehicle by pivoting each unit of rollers about a steering axis normal to the roller axes to effect a combination of rolling and screw propulsion.

5. The method of claim 4 wherein the vehicle is steered by selectively pivoting each unit about its steering axis.

6. The method of claim 4 wherein the vehicle is steered by conjointly pivoting each unit about its steering axis.

References Cited
UNITED STATES PATENTS

| 2,388,711 | 11/1945 | Sawyer | 115—19 |
| 3,250,239 | 5/1966 | Garate | 115—19 |

ANDREW H. FARRELL, *Primary Examiner.*